(12) United States Patent
Matsumoto

(10) Patent No.: US 6,994,935 B2
(45) Date of Patent: Feb. 7, 2006

(54) PROCESS FOR PRODUCING SEPARATOR FOR BATTERIES, THE SEPARATOR FOR BATTERIES, AND ALKALINE STORAGE BATTERIES USING THE SAME

(76) Inventor: Isao Matsumoto, 3-8-10, Ueshio, Tennoji-ku, Osaka-shi, Osaka-fu (JP)

( * ) Notice: Subject to any disclaimer, the term of this patent is extended or adjusted under 35 U.S.C. 154(b) by 143 days.

(21) Appl. No.: 10/102,306

(22) Filed: Mar. 19, 2002

(65) Prior Publication Data

US 2002/0187400 A1 Dec. 12, 2002

(30) Foreign Application Priority Data

Apr. 6, 2001 (JP) .............................. 2001-109082

(51) Int. Cl.
*H01M 2/16* (2006.01)
(52) U.S. Cl. ...................... 429/250; 429/254
(58) Field of Classification Search ................ 429/250, 429/254, 174
See application file for complete search history.

(56) References Cited

U.S. PATENT DOCUMENTS

| | | | |
|---|---|---|---|
| 3,847,676 A * | 11/1974 | Palmer et al. ............... 264/115 |
| 4,117,206 A * | 9/1978 | Plust et al. .................. 429/101 |
| 4,837,119 A | 6/1989 | Ikoma et al. |
| 5,100,723 A | 3/1992 | Iwasaki et al. |
| 5,213,722 A * | 5/1993 | Iwasaki et al. ............. 264/460 |
| 5,278,001 A * | 1/1994 | Ono et al. ................... 429/101 |
| 5,824,435 A * | 10/1998 | Kawano et al. ............. 429/223 |
| 6,403,264 B1 * | 6/2002 | Bunsch et al. ............... 429/249 |
| 6,423,445 B1 * | 7/2002 | Kato et al. .................. 429/142 |
| 6,616,988 B1 * | 9/2003 | Takeuchi et al. ............ 427/596 |

FOREIGN PATENT DOCUMENTS

| EP | 989619 A1 | * | 3/2000 |
| JP | 10101830 A | * | 4/1998 |
| JP | 10125300 A | * | 5/1998 |
| JP | 11297294 A | * | 10/1999 |
| JP | 2000030673 A | * | 10/2000 |

OTHER PUBLICATIONS

Ikoma et al., "Study on self-discharge of a metal hybride rechargeable battery system employing $^{MnNi}5_{-x}{}^Mx$ alloy," *174th Chicago(Fall) Meeting*, 88-2, (1988).

Ikoma et al., "Self-discharge mechanism of sealed-type nickel/metal-hydride battery," *J. Electochem. Soc.*, 143:6, 1904-1907 (Jun. 1996).

* cited by examiner

Primary Examiner—Gregg Cantelmo
(74) Attorney, Agent, or Firm—Merchant & Gould P.C.

(57) ABSTRACT

The present invention relates to the separator for batteries wherein the non-woven cloth comprising fibers mainly composed of polyolefin type resin is provided with hydrophilic property on the fiber surface at least by sulfuric compound and characterized as follows:
(a) the ratio of atomic mass of sulfur to atomic mass of carbon (S/C) is $5 \times 10^{-3}$ to $30 \times 10^{-3}$
(b) the tensile strength is not less than 3 kg/cm² and the preparation method of this separator. The present invention also relates to the secondary batteries using this separator.

9 Claims, 8 Drawing Sheets

PROCESS FOR PRODUCING SEPARATOR FOR BATTERIES, THE SEPARATOR FOR BATTERIES, AND ALKALINE STORAGE BATTERIES USING THE SAME

FIELD OF THE INVENTION

The present invention relates to the improved separator for alkaline storage batteries and the high powered alkaline storage batteries using the same.

BACKGROUND OF THE INVENTION

Jungner battery, that is nickel cadmium batteries (Ni/Cd batteries), invented in the early $20^{th}$ century, enabled to be sealed in 1940s. Ni/Cd batteries have been developed remarkably as secondary batteries which represent alkaline storage batteries with the expansion of the use of small-sized secondary power source, including in such fields as home electric, communications, office tools, sundries use, or the like, since around the year 1970. However, around the year 1990, having a hydrogen absorbing alloy electrode instead of having a cadmium electrode is developed newly, and these nickel-metal hydride storage batteries have been exceeding the Ni/Cd batteries in production and sales amount as a new power source for portable electronic devices with lithium secondary batteries in recent years.

In addition to the above mentioned use, since the market for hybrid electric vehicles (HEVS) put on the market in 1997, electric automobiles, electric scooters, and electric-assisted bicycles is anticipated to expand, the development of highly efficient secondary batteries as the power source thereof (hereafter called power source for mobile use) is expected.

The use as the said power source for mobile use requires high power among the characteristics which are necessary for general use. Further, it is also required to have high reliability and high energy density (small sized and light weighted).

Since alkaline storage batteries are capable of showing these characteristics relatively strongly, they are drawing attention as candidates of power source for mobile use. In particular, Ni/MH batteries among alkaline storage batteries have already been equipped with mass produced HEVs and have been drawing the greatest attention with the reason that they have the image of using clean materials and have high energy density.

Therefore, for the purpose of explaining specifically, as battery system for high power use, which is the aim of the present invention, the explanation follows taking Ni/MH batteries, in particular, sealed cylindrical Ni/MH batteries as an example.

Ni/MH batteries, like Ni/Cd batteries, belong to alkaline storage batteries of 1.2 V systems and have relatively high energy density and high reliability. However, Ni/MH batteries are slightly inferior to Ni/Cd batteries in high power. Therefore, Ni/MH batteries have some problems to decrease the feature of high energy density which is the characteristic inherent to these batteries as a result of volume increase of both positive and negative electrodes' substrate and separators when the batteries are so constructed as to show high power by employing thin and long positive and negative electrodes. In other words, at present, high energy density Ni/MH batteries do not have satisfactory high power characteristics. Therefore, the improvement of high power characteristics is strongly desired.

Heretofore, in producing high powered alkaline storage batteries, many efforts have been made to lower the internal impedance of the batteries including the selection of materials for positive and negative electrodes, materials for electrolyte and the concentration thereof, and further, the improvement in the construction method of both electrodes and batteries. However, the improvement of the separators is drawing attention which deeply relates to the progress in the rate of ionic velocity in passing through the separator between the positive and negative electrodes, or high-powered batteries, since, in some cases, it is even more effective than the above mentioned items, and also plays a great role in stabilizing the self discharge at a low level as a secondary effect. Therefore, further improvement of the separators is desired for high powered Ni/MH batteries.

In addition, there are four essential requirements of the separator for sealed Ni/MH batteries as described below which are common to the general sealed alkaline batteries.

(1) The materials are chemically stable to the electrolyte, or the like.

(2) The negative electrode and the shedding thereof are separated from the positive electrode and the shedding thereof in order to prevent short circuit.

(3) The appropriate amount of the electrolyte is contained in the pores inside of the separator.

(4) There are some appropriate pores so that the oxygen gas generated in the positive electrode can go through.

For the development of the separators used for the batteries with high power use, it is regarded as important that the separators should have the characteristics of low impedance and high reliability, while meeting the above described requirements. In the case that the separators with high reliability of preventing short circuit can be developed, by making separators much more thinner, the concerned extreme decrease of the energy density can be prevented even though the positive and negative electrodes are processed to be thin and long for high power use.

In the past, the non-woven separators which comprise polyamide type resin fibers as materials for separators in mass produced Ni/Cd batteries were used, mainly in sealed cylindrical Ni/Cd batteries, and the separators using this resin fiber are currently used.

On the other hand, as for sealed cylindrical Ni/MH batteries, the problem arises due to the extremely large self discharge in the case of using the conventional polyamide type separators. However, this problem is no more a fatal defect as reported in the 171 th ECS (USA) Fall Mtg, Ext. Abst., Vol. 88–2127(1988), J, Electrochem. Soc., Vol. 143, No6, 1904(1996), or the like by employing polyolefin type separators which are chemically stable to the alkaline electrolytes. It seems that this problem is due to the sooner decomposition of the positive electrode active materials caused by ammonium, nitrous acid, or nitrate ion obtained slightly as the decomposition products of polyamide type resin in the sealed Ni/MH batteries in which hydrogen gas always exists different from the sealed Ni/Cd batteries' case.

However, the polyolefin type separator is generally not easy to get wet with aqueous solution, in other words, is hydrophobic. Therefore, polyolefin type separator requires treatment for providing hydrophilic property. Therefore, the following hydrophilic treatments have been already adopted industrially.

1) To treat with surfactant.
2) Method to graft the hydrophilic groups onto polyolefin with acrylic acid or the like.

3) Method to make sulfo group having hydrophilic property or other groups having the same property react on the surface of the said fiber chemically.

For the purpose of requiring high power, that is, for the purpose of realizing high rate discharge under the wide range of temperatures' atmosphere, it is important to maintain the hydrophilic property for a long time and the self discharge characteristics. From this viewpoint, the method 3) is the most excellent in providing hydrophilic property stably.

At present, it is general to adopt a method of sulfonation by immersing a non-woven separator in concentrated sulfuric acid at a high temperature. The said non-woven separator is prepared by entangling the said polyolefin type resin fiber, in particular, the core-sheath type polyolefin type resin fiber whose core consists of polypropylene type resin and whose surface consists of polyethylene type resin. These methods have been proposed in the unexamined Japanese Patent publication No. 01-132044 or in U.S. Pat. No. 5,100,723.

These proposals have already been employed in the batteries for consumers, or the like. For the high powered batteries, it is necessary to enhance the degree of sulfonation due to the decrease of the impedance within the batteries with the increase of the liquid-retaining property depending on the increase of the hydrophilic property of the separators as described above.

However, the degree of sulfonation, which is defined as the number of sulfur atoms (S) to the number of carbon atoms (C) in polyolefin resin, is not more than $3 \times 10^{-3}$ to $5 \times 10^{-3}$ with the method of immersing the non-woven cloth which comprises the usually used polyolefin type resin fiber having the diameter of about 10 $\mu$m into concentrated sulfuric acid at a high temperature or fuming sulfuric acid. This is because the necessary strength cannot be obtained in constructing spirally wound plates of the battery. This result is brought about by the extreme decrease in physical strength of the fiber itself. That is, when the said method is used, a part of a resin is sulfonated internally and sometimes even goes further to carbonization around the degree of little over $3 \times 10^{-3}$. Thus, it has been difficult to expect further improvement in liquid retention property with the use of the conventional method.

This tendency has been more remarkable when the fiber diameter becomes narrower, and the introduction of non-woven cloth which comprises fine-spun fiber and by which the thinner separator is expected for its high reliability as a separator, becomes even more difficult. Therefore, when the electrode was made thin and long for high power use, it brought about the decrease in the energy density of the batteries since it becomes necessary that the separator with the conventional thickness should also be elongated.

However, it was found that the sulfonation method which is the reaction with $SO_3$ gas can inhibit the carbonization inside the fiber further compared with the conventional method. It was also found that the physical strength of the fiber is hard to be reduced. In the above described patents, in addition to the method of using concentrated sulfuric acid at a high temperature or fumed sulfuric acid, the method to react with $SO_3$ is also proposed although there is no detailed description specifically therein. However, reaction of non-woven cloth comprising polyolefin type fiber with only $SO_3$ gas not merely has made the sulfonation extremely uneven but also hydrophilic property of the whole non-woven cloth lower, and the problem which is the increase of impedance arises. For information, the inner impedance in the conventional AA sized battery structure using the conventional sulfonated separator is 8 to 10 m$\Omega$ but the results have been obtained that the inner impedance in the battery structure substituting only the said conventional sulfonated separator with the separator merely reacting with $SO_3$ gas with other conditions being equal increased to 10 to 13 m$\Omega$.

Non-woven cloth comprising sulfonated polyolefin type resin fiber is an extremely important material for high power use or as a separator of Ni/MH batteries for high rate discharge at a high temperature. However, the conventional method has its limit of the increase in the degree of sulfonation, said increase is performed by providing further hydrophilic property necessary for high power use. In other words, the conventional method of processing with concentrated sulfuric acid or fumed sulfuric acid has the problem to be solved of causing the decrease in physical strength of the fiber, leading separators to break in constructing spirally wound electrodes. Therefore, sulfonation by $SO_3$ gas which can inhibit the decrease in strength draws attention. However, just to react with $SO_3$ gas only makes partial progress of sulfonation on the fiber surface and the uniform sulfonation as a whole is hard to be achieved. Further, the problem that the impedance within the battery increases on the contrary arises.

SUMMARY OF THE INVENTION

The present invention provides the process for producing the separator and the separator capable of solving the said problem of partial reactions, capable of producing the separator of polyolefin type resin fiber which can realize the introduction of hydrophilic group e.g. sulfonation on the surface of non-woven cloth evenly and the said separator has highly hydrophilic property with much higher degree of sulfonation of the non-woven cloth as a whole compared with the conventional separators. The said separators further have strength capable of resisting the tensile force necessary in constructing spirally wound electrodes of the batteries. This purpose is achieved by taking the following steps; As a preliminary treatment process, non-woven cloth is passed through the nearly saturated airflow of water vapor which is immediately followed by the process of making the said cloth pass through the airflow which contains $SO_3$ gas.

The other purpose of the present invention is to provide batteries excellent in high power characteristics, which is essential in Ni/MH batteries for power source for mobile use as well as in batteries for conventional use by applying the said separators. In addition, for similar reasons, sulfonation of a non-woven cloth which comprises fine spun polyolefin resin fibers whose diameter is not greater than 5 $\mu$m considered to be capable of realizing a thinner separator because of high reliability as a separator was also realized. In this case, since the separator is made of a fine spun fiber, it has a larger superficial area and sulfonation can be enhanced further. In other words, the other purpose of the present invention is to provide Ni/MH batteries with high reliability and high energy density as well as with further improvement in high power characteristics by using this thin separator.

In the present invention, with the aim of improving high power characteristics of alkaline storage batteries, especially Ni/MH batteries, liquid retention property which means hydrophilic property substantially is enhanced further than the conventional separators by increasing the degree of sulfonation of the non-woven cloth as a separator which comprises polyolefin type resin fiber.

In the conventional method of using concentrated sulfuric acid, it has been difficult to increase the degree of sulfonation. However, in the process of producing the separator of the present invention, since sulfonation is conducted evenly over the fiber surface of the non-woven cloth, without decreasing the fiber strength very much, the following steps are taken:

(1) making the said non-woven cloth pass through the airflow of water vapor nearly saturated, then
(2) sulfonation is conducted immediately by exposing the said non-woven cloth to $SO_3$ gas airflow, and
(3) as required, drying process is carried out after washing away the sulfur compound which remains on the non-woven cloth.

By conducting the above process, the separator of the present invention consisting of the non-woven cloth which comprises the polyolefin typed resin fiber sulfonated improves the degree of sulfonation without reducing the strength of the fiber itself, and the improvement of sulfonation is achieved by modifying the time of making the non-woven cloth pass through $SO_3$ gas airflow. For information, the degree of sulfonation is represented by the ratio of the mass of the element of sulfur to the mass of the element of carbon (S/C) in foundation cloth comprising a separator, and the said ratio may be the ratio of the number of sulfur atom to the number of carbon atom or the ratio of the number of moles of sulfur atom to the number of moles of carbon atom.

In addition, since the non-woven cloth which comprises fine spun polyolefin type resin fiber has much larger superficial area than the conventional one, the degree of sulfonation of the non-woven cloth with fine spun polyolefin type resin can be improved by further more carrying out the same process, maintaining the same strength of the fiber itself.

The sealed cylindrical (and sealed prismatic) Ni/MH batteries using the sulfonated separator with the improved degree of sulfonation for multi purpose, have excellent high power characteristics, that is, the characteristics of inhibiting the drop of voltage at the time of high rate discharge. In addition, in the case of the non-woven cloth which comprises the said fine spun fiber with further sulfonation, it can be suitable for further high power use. Further, since pore size within the non-woven cloth is kept small and uniform with the fine spun fiber, there is no problem in reliability as the separator is made thinner than the conventional separators. That is, the thinner separator contributes to obtaining the sealed cylindrical (and sealed prismatic) Ni/MH batteries suitable for high power use without lowering the energy density. With regard to the diameter of the fine spun fiber, the average diameter is not greater than 5 μm.

EXPLANATIONS OF LETTERS AND NUMERALS

Figure 1:
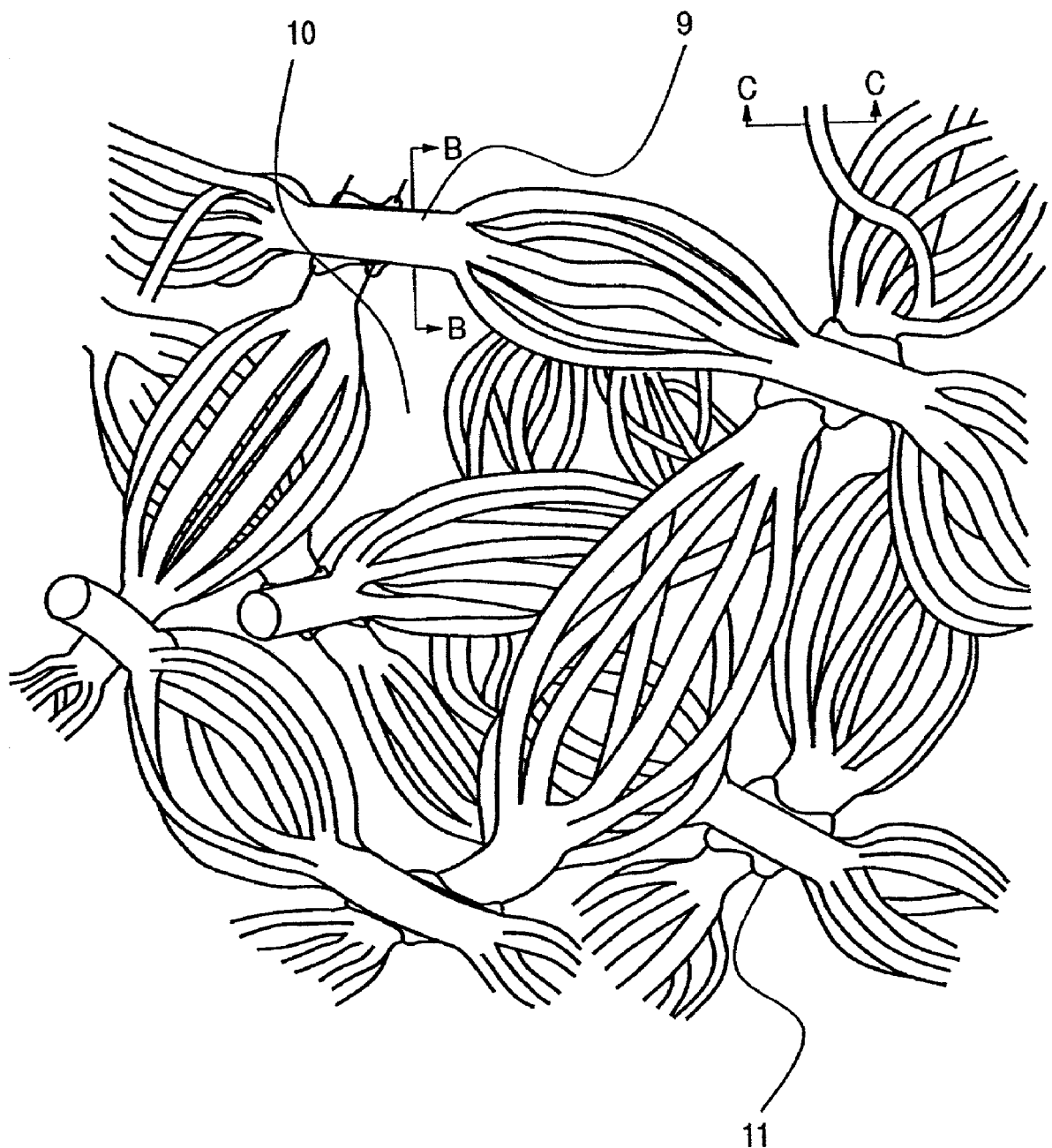
FIG. 1 shows a schematic diagram of a sulfonated polyolefin separator by an embodiment of the present invention.

1: Nickel positive electrode
2: Negative electrode of hydrogen absorbing alloy
3: Separator
4: Positive electrode lead terminal
5: Positive electrode terminal
6: Safety vent
7: Gasket
8: Battery case
9: Polyolefin type resin fiber
10: Space in the separator
x: Sulfonated polyolefin type resin fiber
y: Polypropylene resin part
z: Polyethylene resin part
11: Polyethylene with a low melting point
12: Water vapor treatment tank
13: Sulfonation treatment tank
14: Shield
15: Inner part of a sulfonation treatment tank

DESCRIPTION OF THE PREFERRED EMBODIMENTS

The description of embodiment is explained referring to the figures as follows. In explaining the embodiment, the specific explanation goes taking a sealed cylindrical Ni/MH battery as an example of an alkaline storage battery as described above.

Figure 5:
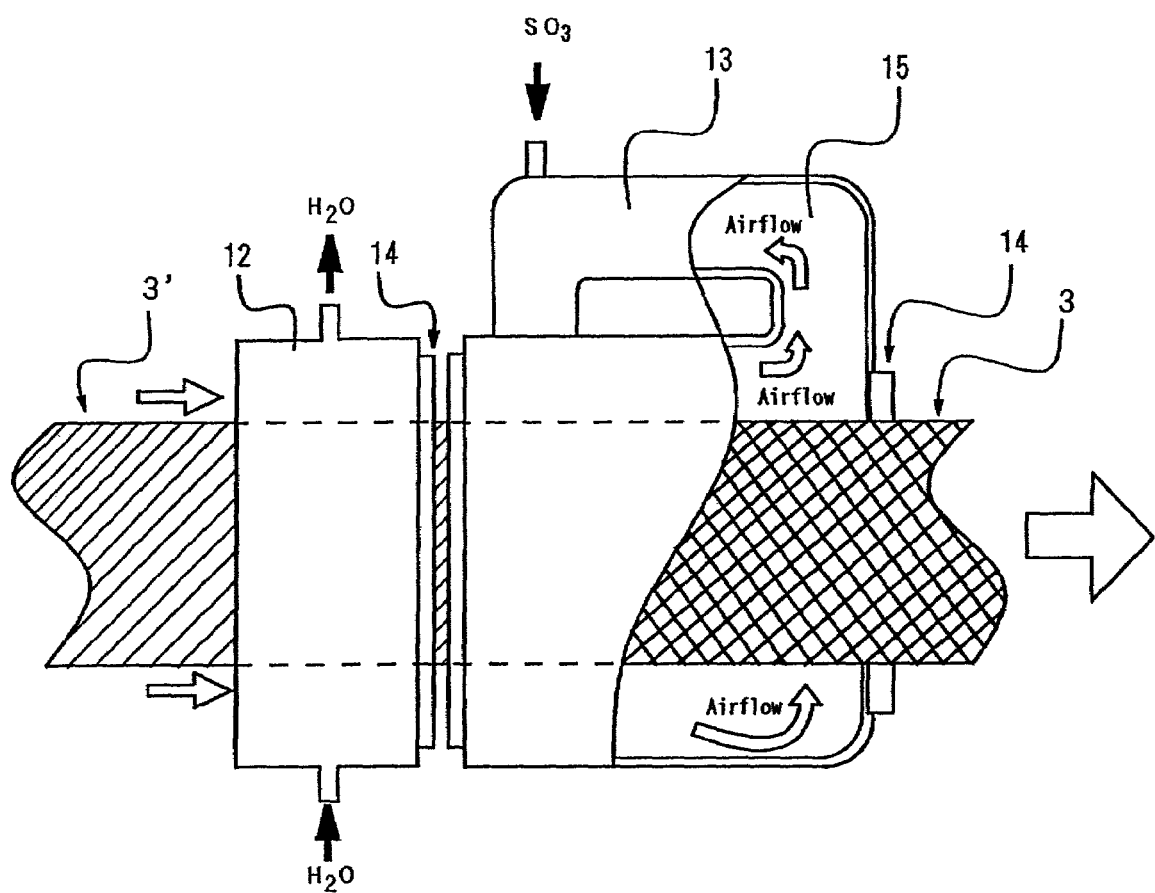
FIG. 5 shows a processing device for sulfonation of the non-woven cloth which comprises polyolefin resin fiber by an embodiment of the present invention.

The process for producing a separator of the present invention has the steps of exposing the non-woven cloth to the airflow with nearly saturated moisture, thereafter immediately exposing the said non-woven cloth to the airflow of the $SO_3$ gas containing $SO_3$ gas mainly as shown in FIG. 5 in order to conduct sulfonation uniformly on the fiber surface without decrease in the fiber strength. The present invention has realized the sulfonation on the fiber surface uniformly by conducting the step of exposing the non-woven cloth to water vapor airflow. The humidity of the water vapor airflow with the nearly saturated moisture in the process for producing separator of the present invention is preferably not less than about 80%. When the humidity is not less than about 80%, it is advantageous from the viewpoint of processing because there is time to conduct the steps flexibly between the step of exposing the non-woven cloth to the water vapor airflow with nearly saturated moisture and the step of exposing the non-woven cloth to $SO_3$ gas airflow. In addition, because of preventing the non-woven cloth from damaging the physical strength, it is preferable from the viewpoint of processing that the water vapor airflow with the nearly saturated moisture has the temperature below the melting point of the polyolefin type resin fiber whose melting point is the lowest among the components comprising the non-woven cloth. Further, it is preferable to dry after washing away the free sulfur compound which remains in the non-woven cloth after the step of exposing the non-woven cloth to $SO_3$ gas airflow since it prevents the unwanted impurities from being included in the battery. As required, after drying, it is preferable that the thickness is rearranged to the desired thickness by making the surface of separator flat with the roll press work which is conducted with the calendar rolls or the like at 60 to 90° C. for preventing the piling of the fiber.

The porosity of the separator of the present invention may be relatively large. However, when the porosity exceeds about 70 vol %, the tensile strength of the non-woven cloth made of general polyolefin type polyester fiber greatly lowers before sulfonation. Therefore, the porosity is preferably not greater than 70 vol %. On the other hand, when the porosity is not greater than 50 vol %, it gets difficult for the oxygen gas generated on the positive electrode to move into the negative electrode at the time of over-charging, while the dividing capability as the separator is enhanced. As a result, it cannot withstand the rise of the gas pressure by a rapid charge. Therefore, the porosity is preferably not less than about 50 vol %.

The concentration of $SO_3$ gas in the said $SO_3$ gas airflow is preferably in the range of 0.5 to 10% and the remaining $SO_3$ gas after the sulfonation reaction is preferably recycled in order and adjusted in the said concentration range. When the said concentration is less than 0.5%, it takes too much time in sulfonation, therefore, it is not preferable. On the other hand, when the said concentration exceeds 10%, it takes too little time in sulfonation, which leads to the difficulty in controlling the sulfonation all over the non-woven cloth uniformly. Therefore, it is not preferable, either.

Figure 3:
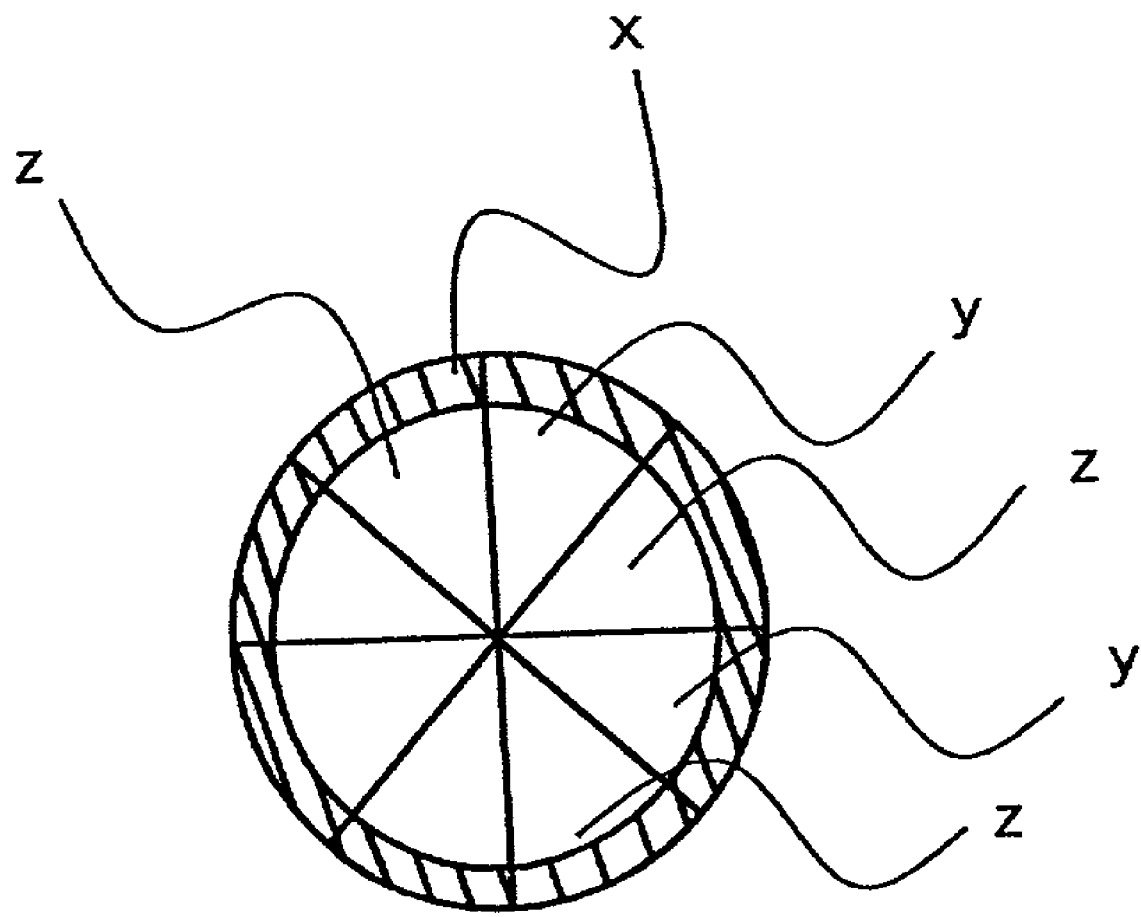
FIG. 3 shows a schematic diagram of a sectional view taken along a line B—B in FIG. 1.
Figure 4:
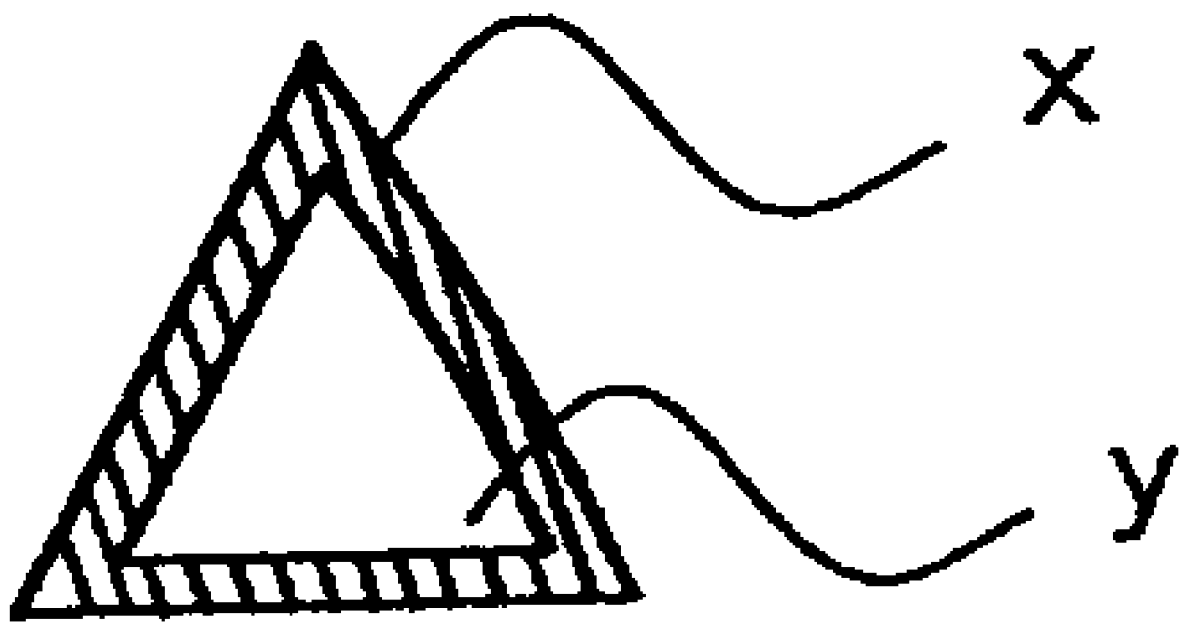
FIG. 4 shows a schematic diagram of a sectional view taken along a line C—C in FIG. 1.

As illustrated in FIG. 3, in the alkaline storage batteries of the present invention, the electrodes comprise the nickel positive electrode mainly comprising conventional nickel hydroxide powder and the alloy negative electrode mainly comprising $AB_5$ type hydrogen absorbing alloy powder interposing the separator with the non-woven cloth consisting of polyolefin type resin fiber sulfonated therebetween. The said electrodes are inserted into the cylindrical metal case with one side opened, in which alkaline electrolyte is poured, thereafter sealed by the cap, thereby obtaining the sealed cylindrical nickel hydrogen storage batteries.

For high power use, it is taken for normal method to widen the electrochemical reaction area of both electrodes by making positive electrodes and negative electrodes thinner than those of the conventional batteries. To take one example at the positive electrode, the thickness of the electrode of 0.6 to 0.8 mm is made thinner to 0.5 to 0.6 mm, and the elongation of the electrodes and separators accordingly is also attempted. However, as long as the separator with the same thickness is used, as a result that the volume of the separator occupying in the batteries increases with the elongation, the battery capacity extremely decreases. Therefore, microscopic short circuit has been liable to occur when the separators are made thinner. However, in the present invention, highly reliable battery is obtained as in the conventional battery even though its thickness at the positive electrode is 0.3 to 0.5 mm and the targeted further improvement of high power characterietics is available. This is because in the present invention, the uniform and high degree of sulfonation of the thin type fine spun polyolefin resin fiber can be achieved without causing any decrease in the physical strength, which has been difficult to achieve with the sulfonation method using the conventional concentrated sulfuric acid or simply processing with $SO_3$ gas. Naturally, the present invention cannot only make a conventional polyolefin resin fiber the uniform and high degree of sulfonation, but also make a conventional general-purpose batteries used with the separator of this invention high powered.

As below, the explanation goes as to the process of producing the separator of the present invention and the batteries using the same.

Figure 2:
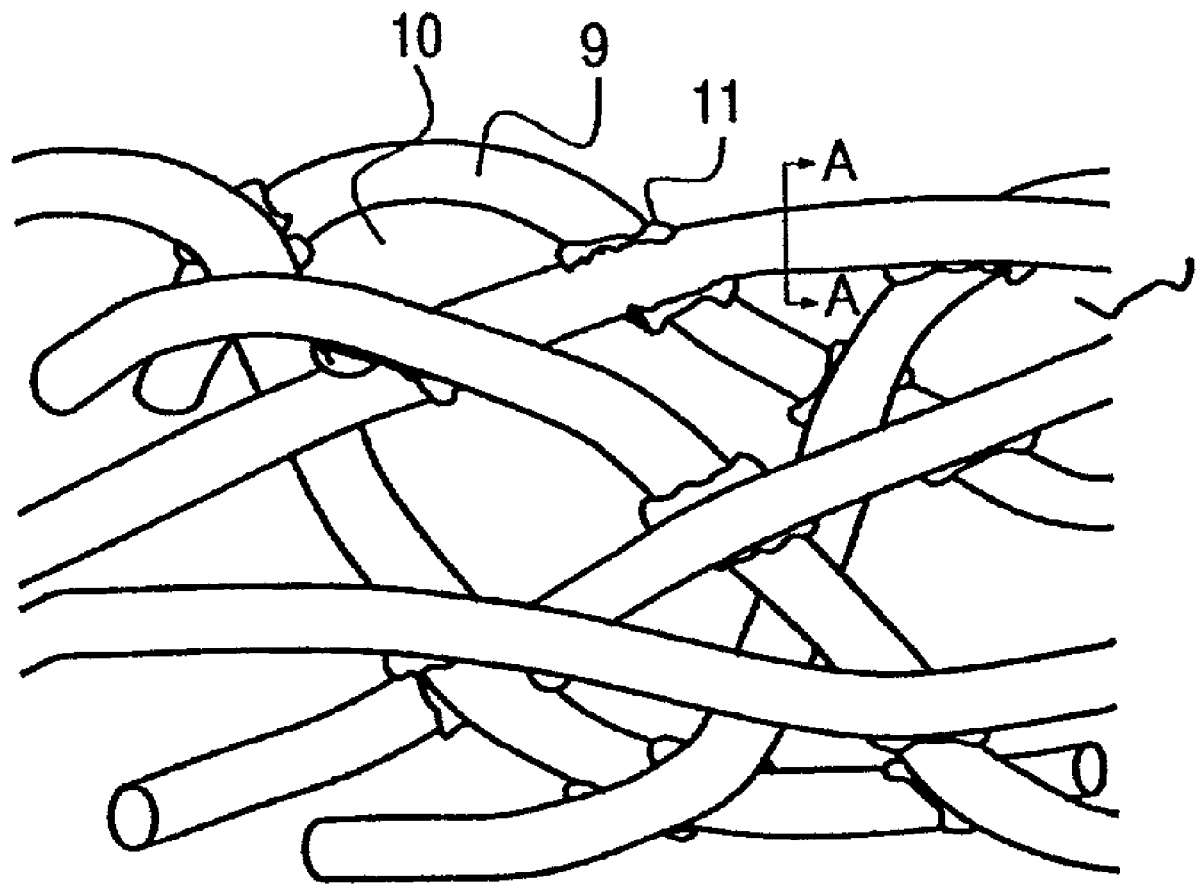
FIG. 2 shows a schematic diagram of a sulfonated polyolefin separator by an embodiment of the present invention.

FIGS. 1 and 2 show examples of the non-woven cloth comprising polyolefin type resin fiber which comprises the sulfonated non-woven cloth with the bundle of fine spun fibers entangled and the sulfonated non-woven cloth with the core-sheath type fibers entangled, respectively. Sulfonation is concentrated in the vicinity of the surface of each fiber, and is conducted uniformly and the degree of sulfonation is $5 \times 10^{-3}$ to $30 \times 10^{-3}$, much higher rate compared with that of the separator for multi-purpose of about $3 \times 10^{-3}$. Since sulfonation concentrates in the vicinity of the surface of each fiber, the resin in the fiber remains intact without being sulfonated. In other words, since the inner part of the fiber is not sulfonated or further carbonized, nearly initial level of the physical strength is maintained therein. The separators shown in FIGS. 1 and 2 retain much electrolyte without variation and decrease the inner impedance in the battery since the degree of sulfonation is high. For information, in the AA sized battery structure, when the separators shown in the FIGS. 1 and 2 are used, the impedance in the AA sized battery structure becomes 3 to 6 m$\Omega$, much lower than 8 to 10 m$\Omega$, the value obtained when conventional sulfonated separators are used.

Here, sulfonation can be conducted by processing with the $SO_3$ gas airflow including $SO_3$ gas as sulfuric compound or sulfonation group can be added in the vicinity of the fiber surface by the process of $SO_3$ gas airflow including at least $SO_3$ gas in the air or inert gases. Further, this processing may be conducted by adding a little amount of fluorine gas or carbon dioxide gas in the airflow because the separator with sulfo group substituted for the functional group in which the fluorine atom is substituted for the oxygen atom in the elements comprising sulfo group and the functional group in which the carbonate ion is added to sulfo group is provided with hydrophilic group and shows the property similar to the separator with sulfo group introduced in the vicinity of the fiber surface. In other words, as required, HF gas whose concentration is not greater than 1% and/or $CO_2$ gas whose concentration is not greater than 1% may be contained in the said $SO_3$ gas airflow wherein at least $SO_3$ gas is contained in the said $SO_3$ gas airflow. When the concentration of the said HF gas exceeds 1%, the fiber itself gets fluorinated too much and the hydrophilic property deteriorates. When the concentration of the said $CO_2$ gas exceeds 1%, $CO_2$ gas works against sulfonation.

In particular, as for the separator shown in FIG. 1, further specific explanation goes thereafter. Since the separator has a configuration wherein the bundle of the fine spun fiber of at least two different polyolefin type resins is bound at the entangled part, this separator has the superficial area three to four times as large as that of the separator shown in FIG. 2 and has more uniform and thinner space than the separator shown in FIG. 2. Therefore, the separator shown in FIG. 1 is excellent in capability as a separator and at the same time, much higher degree of sulfonation can be realized. Therefore, the separator shown in FIG. 1 is suitable for batteries with higher power required, since the separator shown in FIG. 1 has more excellent capability as a separator and higher degree of sulfonation compared with the separator shown in FIG. 2.

Further, since the separator shown in FIG. 1 is excellent in capability as a separator and has high reliability, no problem occurs in the case that the thickness of the separator is made thinner to about 80 $\mu$m, thinner than the conventional separator with the thickness of about 150 $\mu$m. As a result, the space between the positive electrode and the negative electrode can be narrowed, thereby capable of reducing the internal resistance in the battery. Since the thinning of the separator naturally makes the volume of the separator which occupies in the battery smaller, this also contributes to the high capacity of the battery, and when this is applied to the AA sized Ni/MH batteries, the capacity increases by about 5% by calculation.

In addition, as above mentioned, in the case that the thickness of the positive electrode is made thinner to 0.3 to 0.5 mm and the thickness of the negative electrode is made thinner to 0.15 to 0.3 mm, the extreme decrease in capacity can be prevented by using this thin and highly reliable separator, and further, the decrease on the capacity of the batteries for high power use can be inhibited.

Further, in order to increase the battery capacity rather than inhibit the decrease of it, it is more preferable to combine with the battery case can whose side wall is thinner than that of the conventional battery case can. In other words, by making the thickness of the side wall of about 0.25 mm generally used for AA sized battery case can 0.15 mm, the volume in the battery increases by about 4%. By filling the increased portion with active materials, 4% of the increase in capacity can be expected. For information, even though the side wall becomes thinner, strength of the inner pressure to the battery does not fall short for practical use.

In addition, when the electrodes become thin, the secondary effect from the view point of cost effectiveness of the batteries can be achieved since instead of an expensive three-dimensional mesh type electrode support medium, that is, an electrode substrate, a simple and low cost electrode substrate which is nothing but an electrode substrate in which a metal foil is mechanically processed unevenly, or a simple and low cost electrode substrate obtained by conducting an electrolysis deposition to produce a similar configuration by an electrolytic process, or a substrate obtained by blasting with aluminum powders or the like on the surface of the foil or the surface of the above two types of substrate can be used.

Consequently, by using the separator of the present invention, the internal impedance of the battery caused by the separator can be greatly reduced, and high rate discharge characteristics (high power characteristics) can be remarkably improved. At the same time, by using the thin type separator with high degree of sulfonation which comprises fine spun polyolefin resin fiber, the increase rather than decrease of the battery capacity can be expected by combining the metal cylindrical battery case whose side wall is thin even when the said thin electrode for high power use is used. Further, since the employment of low cost electrode base material is realized in accordance with the thin electrode, the cost effect of the battery can also be realized.

FIG. 1 of the present invention shows an example wherein the bundle of fine spun fiber is divided into 8 portions as shown in FIG. 3, however, the fine spun fiber may be divided into more than 8 portions. FIG. 1 also shows taking two types of polyolefin resins whose sectional views are substantial triangles as an example, however, more polyolefin type resins or these resins with different degree of polymerization may be present. In such cases, it is preferable to present materials further excellent in mechanical strength.

The specific explanation has been made taking sealed cylindrical Ni/MH storage batteries as an example. Based on the similar principle, the present invention can be applied to sealed prismatic Ni/MH storage batteries. Further, based on the similar principle, the present invention can easily be applied to sealed cylindrical or prismatic Ni/Cd batteries, or larger size prismatic Ni/Cd storage batteries.

Next, the specific example is explained by using Examples, but the present invention is not limited to these Examples. For information, the entanglement is conducted by a known method. Tensile strength, the number of moles of sulfur atom or carbon element, voltage of the battery, and the rate of discharge are measured by a known method.

(Production Method of the Positive Electrode 1)

The paste which comprises commercially available spherical type nickel hydroxide powder whose average diameter is about 15 $\mu$m and a small amount of fluorine plastic powder and conductive material powders was coated on the nickel foil with the thickness of 30 $\mu$m having innumerable concaves and convexes by a known meted and was pressed after drying by a known method, thereby obtaining a positive electrode with the thickness of 400 $\mu$m. This electrode was made into a size of 40 mm in width and 170 mm in length by cutting and the thin and long positive electrode with the volume of about 1700 mA in theory was produced.

(Production Method of the Positive Electrode 2)

The positive electrode was produced by the similar method as in production method of the positive electrode 1, with the exception that the foamed metal type positive electrode for multi purpose with the thickness of 0.7 mm was used and was made into a size of 40 mm in width and 85 mm in length by cutting.

(Production Method of the Negative Electrode 1)

The water solution paste which comprises commercially available $AB_5$ type hydrogen absorbing alloy whose average diameter is about 10 $\mu$m was coated on the nickel foil with the thickness of 30 $\mu$m having innumerable concaves and convexes by a known method and was pressed after drying by a known method, thereby obtaining a negative electrode wit the thickness of 240 $\mu$m. This electrode was made into a size of 40 mm in width and 230 mm in length by cutting and the negative electrode with the volume of about 2400 mA in theory was produced.

(Production Method of the Negative Electrode 2)

The negative electrode was produced by the similar method as in production method of the negative electrode 1, with the exception that the paste type hydrogen absorbing alloy for multi purpose with the thickness of 0.35 mm was used and was made into a size of 40 mm in width and 140 mm in length by cutting.

EXAMPLE 1

The specific examples are explained as below.

Polyolefin fibers and polyethylene fibers as shown in FIG. 3 are integrated into a focusing fiber that can be divided into 8 as fine spun fibers in a way that the respective fibers which contact with one another are bonded by fusion at contacting portions and the crossing parts of fibers (diameter: 10 $\mu$m) with polyolefin fibers and polyethylene fibers as fine spun fibers alternatively arranged in the circumferential direction of the sectional view in the focusing fibers are entangled by a polyethylene whose melting point is low thereby obtaining a non-woven cloth with the average thickness of 100 $\mu$m, porosity of 60% and tensile strength of 6.2 kg/cm$^2$.

By exposing the said non-woven cloth to a high-speed water jet, disentangled parts of the focusing fibers which constitute the said non-woven cloth were divided into each fine spun fiber, thereafter making the fine fiber pass through a hot roll at the temperature of about 80° C. and adjusting the thickness of the non-woven fiber into 70 to 80 $\mu$m, thereby obtaining a wide belt-like finalized non-woven cloth as shown in FIG. 1. Subsequently, the wide belt-like finalized non-woven cloth was exposed to the atmosphere in the water vapor bath with the moisture of about 95% and the temperature of about 70° C. shown in 12 of FIG. 5 for 10 seconds, thereafter sulfonated by immediately putting the non-woven cloth into a bath for sulfonation treatment shown in 13 of FIG. 13 and by exposing the cloth to about 3 wt % of $SO_3$ gas airflow at the temperature of 50° C. for 20 seconds, followed by washing the sulfonated non-woven cloth with water and drying, thereby obtaining the separator whose finalized thickness of 70 to 80 μm with the degree of sulfonation of about $20\times10^{-3}$. For information, such an operation was conducted that after drying the moisture by rinsing, the thickness of the separator was adjusted to be 70 to 80 μm uniformly through a hot roll, thereby remaking the surface flat.

EXAMPLES 2 TO 4

Separators with the degree of sulfonation of $5\times10^{-3}$, $10\times10^{-3}$ and $30\times10^{-3}$ respectively were obtained by the same method as in Example 1 except that the time for exposure to about 3 wt % of $SO_3$ gas airflow with the temperature of 50° C. was adjusted.

EXAMPLES 5 TO 7

Separators with the degree of sulfonation of $15\times10^{-3}$, $10\times10^{-3}$ and $5\times10^{-3}$ respectively were obtained by the same method as in Example 1 except that the non-woven cloth comprising a core-sheath type polyolefin fiber for multi purpose whose diameter is about 9 mm was used and the time for exposure to about 3 wt % of $SO_3$ gas airflow with the temperature of 50° C. was adjusted in order to obtain desired degree of sulfonation.

EXAMPLES 8 TO 10

Separators with the degree of sulfonation of about $20\times10^{-3}$ and the finalized thickness is 100 to 120 μm, with the degree of sulfonation of about $20\times10^{-3}$ and the finalized thickness is 140 to 160 μm, and with the degree of sulfonation of about $20\times10^{-3}$ and the finalized thickness is 200 to 220 μm, respectively, were obtained by the same method as in Example 1 except that only the non-woven cloth was made thick, while the porosity was kept about 60 vol %.

EXAMPLES 11 TO 14

Separators with the degree of sulfonation of $3\times10^{-3}$ and the thickness is 100 to 120 μm, with the degree of sulfonation of $3\times10^{-3}$ and the thickness is 140 to 160 μm, and with the degree of sulfonation of $3\times10^{-3}$ and the thickness is 200 to 220 μm, respectively, were obtained by the same method as in Example 1 except that the thickness of the non-woven cloth was made to be 70–80 μm, 100–120 μm, 140–160 μm, 200–220 μm, respectively, and the time for exposure to about 3 wt % of $SO_3$ gas airflow with the temperature of 50° C. was adjusted.

EXAMPLE 15

Separators with the degree of sulfonation of about $10\times10^{-3}$ were obtained by the same method as in Example 1 except that the non-woven cloth with the porosity of about 60 vol % comprising the core-sheath type polyolefin fiber for multi-purpose whose diameter is about 9 mm and the thickness of 120 μm was used, and the said non-woven cloth was exposed to about 3 wt % of $SO_3$ gas airflow with the temperature of 50° C. for 12 seconds.

EXAMPLES 16 TO 18

Separators with the degree of sulfonation of about $20\times10^{-3}$ and the finalized thickness is 80 to 100 μm, with the degree of sulfonation of about $20\times10^{-3}$ and the finalized thickness is 140 to 160 μm, and with the degree of sulfonation of about $20\times10^{-3}$ and the finalized thickness is 200 to 220 μm, respectively, were obtained by the same method as in Example 1 except that only the non-woven cloth was made thick, while the porosity was kept about 60 vol %.

EXAMPLES 19 TO 22

Separators with the degree of sulfonation of $3\times10^{-3}$ and the thickness is 100 to 120 μm, 140 to 160 μm, 200 to 220 μm, respectively, were obtained by the same method as in Example 15 of separators except that the thickness of the non-woven cloth was made to be 100 to 120 μm, 140 to 160 μm, 200 to 220 μm, respectively, and that the time for exposure to about 3 wt % of $SO_3$ gas airflow with the temperature of 50° C. was adjusted.

COMPARATIVE EXAMPLE 1

The non-woven cloth used in the Example 1 was sulfonated by the conventional method of using concentrated sulfuric acid with high temperature, which was conducted by immersing the non-woven cloth in 96 wt % of concentrated sulfuric acid heated at about 100° C. and thereafter eliminating residual $SO_4^{2-}$ by making the concentration of sulfuric acid shift to lower concentration in order to avoid sudden heat generation caused by hydration heat, followed by rinsing the sulfonated non-woven cloth, thereafter drying, thereby obtaining a separator with the degree of sulfonation of $3\times10^{-3}$.

COMPARATIVE EXAMPLE 2

Separators with the degree of sulfonation of $4\times10^{-3}$ and with the thickness of 70 to 80 μm were obtained by the same method as in Comparative Example 1 except that the degree of sulfonation of $4\times10^{-3}$ was obtained by adjusting the time of immersing the non-woven cloth into a concentrated sulfuric acid.

COMPARATIVE EXAMPLES 3 TO 5

The non-woven cloth comprising a core-sheath type polyolefin fiber for multi-purpose with the fiber diameter of about 9 mm and with the thickness of 70 to 80 μm was used and sulfonated by the conventional method of using concentrated sulfuric acid with high temperature, that is, immersing the non-woven cloth in 96 wt % of concentrated sulfuric acid heated at about 100° C. and eliminating residual $SO_4^{2-}$ by making the concentration of sulfuric acid shift to lower concentration in order to avoid sudden heat generation caused by hydration heat, followed by rinsing the sulfonated non-woven cloth, thereafter drying, thereby obtaining a separator with the degree of sulfonation of $3\times10^{-3}$, $4\times10^{-3}$, and $7\times10^{-3}$.

COMPARATIVE EXAMPLES 6 TO 8

Separators with the degree of sulfonation of $3\times10^{-3}$ and the thickness of 100 to 120 μm, 140 to 160 μm, 200 to 220

μm, respectively, were obtained by the same method as in the Comparative Example 3 except that only the thickness of non-woven cloth was made 100 to 120 μm, 140 to 160 μm, 200 to 220 μm, respectively.

COMPARATIVE EXAMPLES 9 TO 12

Separators with the degree of sulfonation of $3\times10^{-3}$ and the thickness of 100 to 120 μm, 140 to 160 μm, 200 to 220 μm, respectively, were obtained by the same method as in the Comparative Example 3 except that only the thickness of non-woven cloth was made 70 to 80 μm, 100 to 120 μm, 140 to 160 μm, 200 to 220 μm, respectively, and that the time was adjusted for immersing the non-woven cloth into 96 wt % of concentrated sulfuric acid at the temperature of 100° C. by pressuring in order to make the degree of sulfonation $5\times10^{-3}$.

EXAMPLE 23

Figure 6:
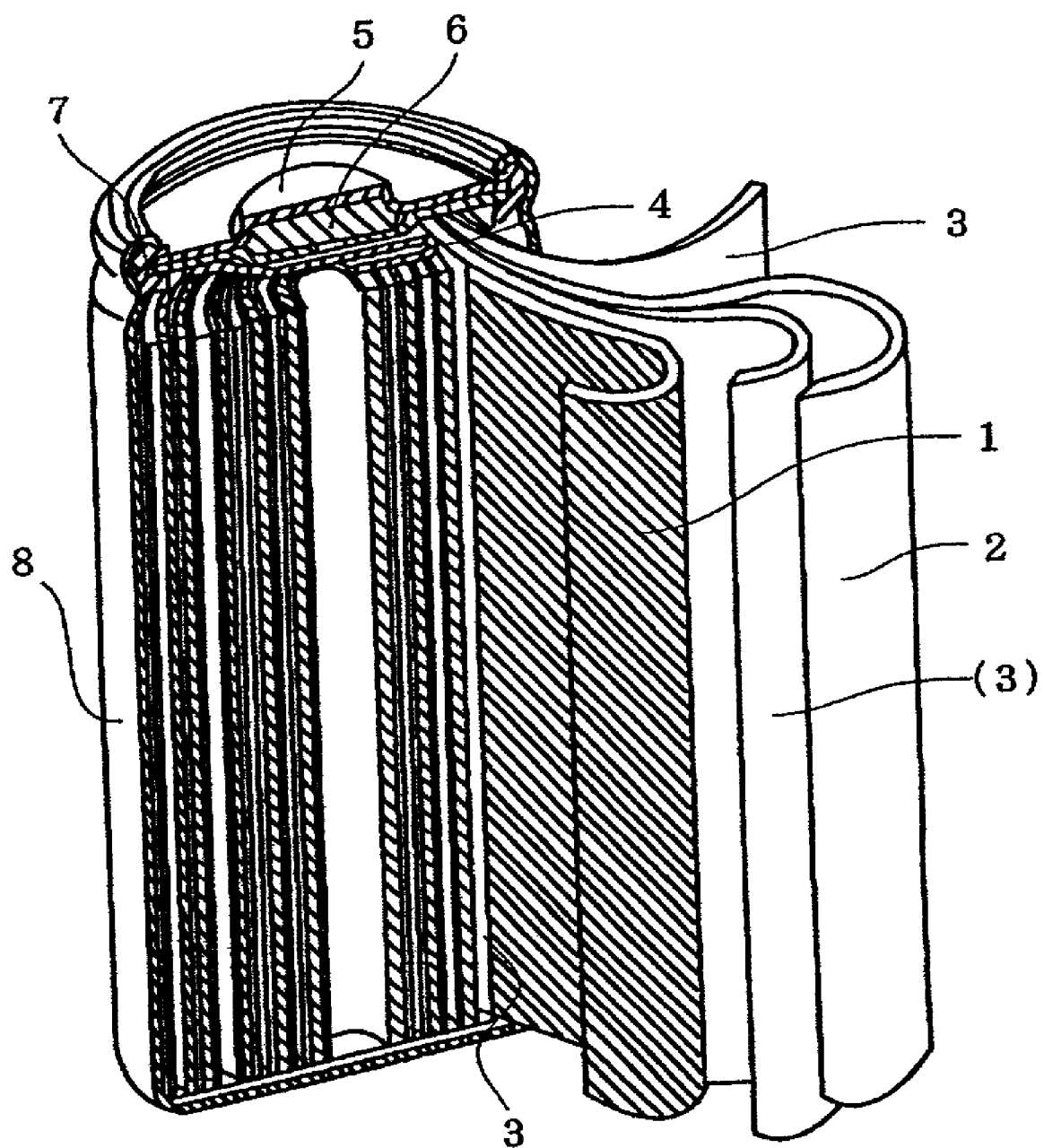
FIG. 6 shows sealed cylindrical Ni/MH batteries (AA size) by an embodiment of the present invention.

The electrodes were constructed by coiling the positive electrode and negative electrode which were prepared in the said production method of the positive electrode 1 and the negative electrode 1 interposing a separator therebetween and the electrodes were inserted in the battery case in which the nickel is plated, whose thickness of the side wall is 0.16 mm and whose thickness at the bottom is 0.25 mm is processed into the cylindrical container with an aperture at one end. Then, 1.8 cc of about 30 wt % of KOH solution is poured into the battery case which is then sealed by the lid provided with a safety vent, thereby preparing the AA-size sealed cylindrical Ni/MH storage batteries as shown in FIG. 6. For information, although both positive and negative electrodes used in this Example were thin and long, when high power characteristic is not required, electrodes with the conventional thickness can be used as both positive and negative electrodes. In this case, by using the separators of this Example 1, the higher capacity than the conventional separators can be realized since the volume occupied in the battery of the separators decreases, therefore it is preferable. Further, it is sometimes convenient in constructing batteries to adjust the desired thickness by conducting a roll press again as required at the temperature of about 70° C. after the separators of the present invention cited in this Example was obtained.

EXAMPLES 24 TO 30

By using the separators of Examples 8 to 14, AA-size sealed cylindrical Ni/MH storage batteries of Examples 24 to 30 were prepared by the same construction method shown in Example 23.

EXAMPLES 31 TO 38

AA-size sealed cylindrical Ni/MH storage batteries of Examples 31 to 38 were prepared by the same construction method shown in Example 23 except that the separators of Examples 15 to 22 were used and the positive and negative electrodes of nearly multi-purpose thick type electrodes shown in the production method of the positive electrode 2 and production method of the negative electrode 2 were used.

COMPARATIVE EXAMPLES 13 TO 20

By using the separators of Comparative Example 3, and Examples 6 to 12, AA-size sealed cylindrical Ni/MH storage batteries of Comparative Examples 13 to 19 were prepared by the same construction method shown in Example 23.

COMPARATIVE EXAMPLE 21

By taking the same method of Example 1, a separator with the degree of sulfonation of about $20\times10^{-3}$ and with the finalized thickness of 70 to 80 μm was obtained. For information, after drying moisture caused by rinsing, the operation to make the thickness of the separator uniform, i.e., 70 to 80 μm by passing the separator through a hot roll with the temperature of about 100° C. thereby remaking the surface flat. AA-size sealed cylindrical Ni/MH storage batteries were prepared by the same construction method shown in Example 23.

(Evaluation)

(Tensile Strength)

Figure 7:
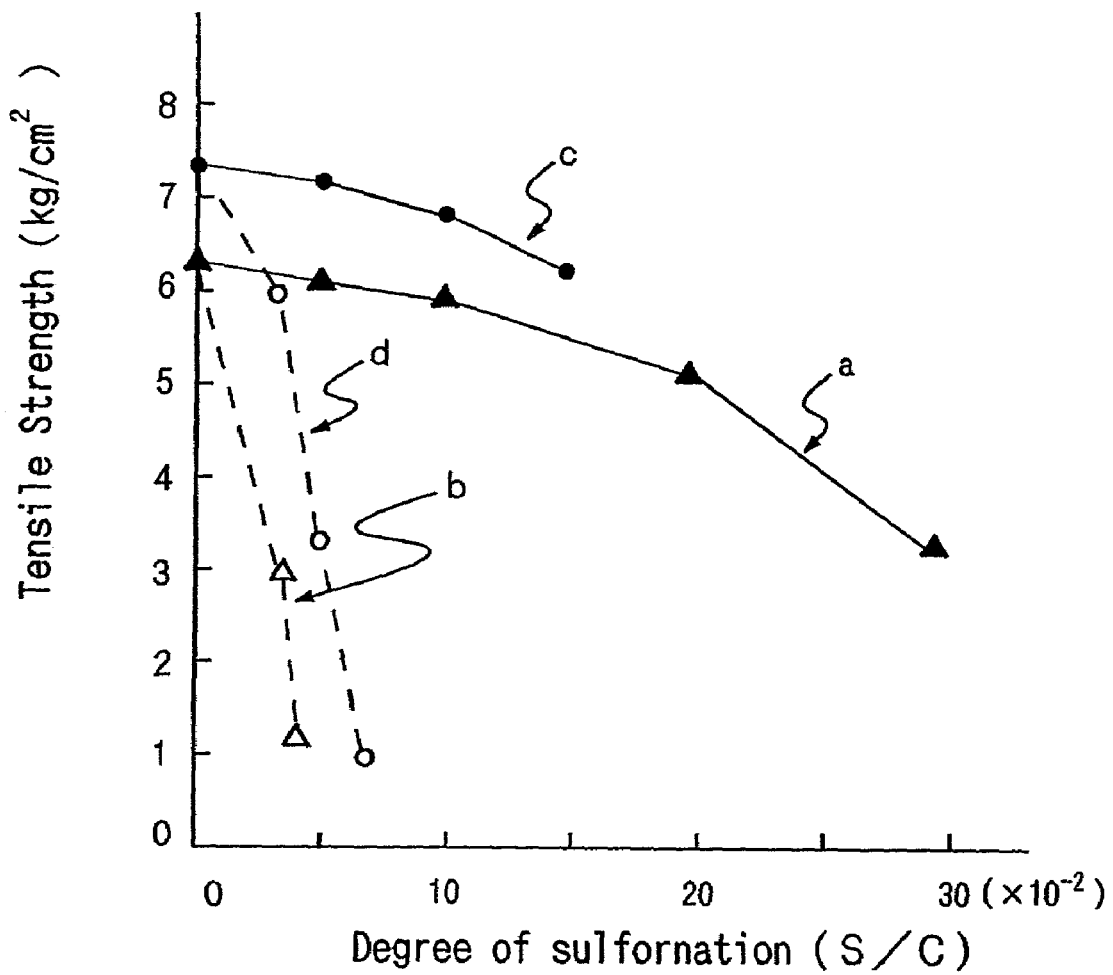
FIG. 7 shows the relation between the degree of sulfonation and the tensile strength in a separator by an embodiment of the present invention.

Tensile strength of the separators of Examples 1 to 7 and Comparative Examples 1 to 5 was measured using the known tensile strength measuring device. The result is shown in FIG. 7. As for separators in Examples 1 to 4, tensile strength of not less than 3 kg/cm$^2$ was maintained, thereby obtaining necessary strength at the time of constructing the electrodes even when the degree of sulfonation was enhanced to $30\times10^{-3}$. On the other hand, in Comparative Examples 1 and 2, even when the non-woven cloth similar to Examples 1 to 7 was used, as the degree of sulfonation was enhanced, even with the low degree, great decrease of tensile strength occurred, and it was not available for the practical use at the degree of sulfonation of $3\times10^{-3}$. In addition, the separator obtained by conducting the sulfonation treatment of the process of this invention to the non-woven cloth comprising core-sheath type polyolefin fiber with the diameter of about 9 μm for multi-purpose used in Examples 5 to 7 was capable of keeping the decrease in tensile strength low in accordance with the enhancement of the sulfonation as shown in FIG. 7.c. However, since the non-woven cloth comprising core-sheath type polyolefin fiber used in Examples 5 to 7 has small superficial area, there is a limit in the degree in sulfonation and the degree remained around $15\times10^{-3}$. For information, as in Comparative Examples 3 to 5, the conventional method of sulfonation of using the non-woven cloth comprising core-sheath type polyolefin fiber, the separator could not withstand the necessary strength at the time of constructing the electrode plates when the degree of sulfonation is not less than $5\times10^{-3}$. In other words, it is found that the separator of the present invention has a smaller degree of decrease in tensile strength even when the degree of sulfonation is enhanced.

(Microscopic Short Circuit in the Cycle Life Test)

30 cells of AA-sized sealed cylindrical Ni/MH storage batteries in Examples 23 to 38 and in the Comparative Examples 13 to 20 were prepared and the 100 cycles of cycle life tests were conducted which repeat 1 C discharge and 1 C charge (110% charge of the discharge capacity) at the temperature of 20° C. for each cell and the microscopic short circuit for each cell was examined. The results are shown in Tables 1 to 3. For information, the number of short circuit of the batteries is represented as (the number of cells with the microscopic short circuit observed)/(the number of cells with the cycle life test conducted)

TABLE 1

| | Examples | | | | | | | |
|---|---|---|---|---|---|---|---|---|
| | 23 | 24 | 25 | 26 | 27 | 28 | 29 | 30 |
| Separator type | f | f | f | e | e | e | e | e |
| Fiber diameter ($\mu$m) | 3 | 3 | 3 | 3 | 3 | 3 | 3 | 3 |
| Degree of sulfonation | $20 \times 10^{-3}$ | $20 \times 10^{-3}$ | $20 \times 10^{-3}$ | $20 \times 10^{-3}$ | $3 \times 10^{-3}$ | $3 \times 10^{-3}$ | $3 \times 10^{-3}$ | $3 \times 10^{-3}$ |
| Separator thickness ($\mu$m) | 70~80 | 100~120 | 140~160 | 200~220 | 70~80 | 100~120 | 140~160 | 200~220 |
| Number of short circuit of battery | 1/30 | 0/30 | 0/30 | 0/30 | 0/30 | 0/30 | 0/30 | 0/30 |

TABLE 2

| | Examples | | | | | | | |
|---|---|---|---|---|---|---|---|---|
| | 31 | 32 | 33 | 34 | 35 | 36 | 37 | 38 |
| Separator type | h | h | h | h | g | g | g | g |
| Fiber diameter ($\mu$m) | 9 | 9 | 9 | 9 | 9 | 9 | 9 | 9 |
| Degree of sulfonation | $10 \times 10^{-3}$ | $10 \times 10^{-3}$ | $10 \times 10^{-3}$ | $10 \times 10^{-3}$ | $3 \times 10^{-3}$ | $3 \times 10^{-3}$ | $3 \times 10^{-3}$ | $3 \times 10^{-3}$ |
| Separator thickness ($\mu$m) | 100~120 | 70~80 | 140~160 | 200~220 | 70~80 | 100~120 | 140~160 | 200~220 |
| Number of short circuit of battery | 4/30 | 2/30 | 0/30 | 0/30 | 5/30 | 2/30 | 0/30 | 0/30 |

TABLE 3

| | Comparative Examples | | | | | | | |
|---|---|---|---|---|---|---|---|---|
| | 13 | 14 | 15 | 16 | 17 | 18 | 19 | 20 |
| Separator type | i | i | i | i | j | j | j | j |
| Fiber diameter ($\mu$m) | 9 | 9 | 9 | 9 | 9 | 9 | 9 | 9 |
| Degree of sulfonation | $3 \times 10^{-3}$ | $3 \times 10^{-3}$ | $3 \times 10^{-3}$ | $3 \times 10^{-3}$ | $5 \times 10^{-3}$ | $5 \times 10^{-3}$ | $5 \times 10^{-3}$ | $5 \times 10^{-3}$ |
| Separator thickness ($\mu$m) | 100~120 | 70~80 | 140~160 | 200~220 | 70~80 | 100~120 | 140~160 | 200~220 |
| Number of short circuit of battery | 8/30 | 3/30 | 0/30 | 0/30 | 19/30 | 11/30 | 0/30 | 0/30 |

As for the batteries using the thin electrodes in Examples 23 to 26, as shown in f in the separator type of Table 1, the number of cells with the microscopic short circuit observed remained 1 cell even when the thickness was made thin to 70 to 80 $\mu$m and the thickness was extremely near 70 $\mu$m. Therefore, it is clear that the separators of the Examples have high reliability free from microscopic short circuit up to the thickness of around 80 $\mu$m. In addition, as for the batteries using the thin electrodes in Examples 27 to 30, that is, the batteries with a separator whose degree of sulfonation is similar to the separator for multi-purpose as already shown in e in the separator type column in Table 3, no microscopic short circuit was recognized in any thickness. On the other hand, as for the batteries with the thin electrodes in the Comparative Examples 13 to 20, in i whose degree of sulfonation is about the same as that of e, microscopic short circuit came to be recognized when the thickness gets thin with around 120 $\mu$m, and in j whose degree of sulfonation is enhanced to $5 \times 10^{-3}$, microscopic short circuit came to be recognized when the thickness gets thin with around 160 $\mu$m. In particular, when the degree of sulfonation is $5 \times 10^{-3}$, in one third of the cells using the separators with the thickness of about 120 $\mu$m microscopic short circuit was recognized, proving it was not good. Further, as for the batteries using the thick electrodes similar to those for multi-purpose in Examples 31 to 38, as shown in g and h of the separator type column, microscopic short circuit was not recognized up to 140 $\mu$m, showing high reliability.

(High Power Characteristics)

As for the batteries in the Examples 24, 27, 31 and 36 and in the Comparative Examples 15 and 20, three cells were randomly selected from many batteries prepared beforehand, and after conducting three cycles of charge and discharge which is an activated process to make stabled characteristics, 50% of the amount to be used was charged, thereby examining high power characteristics.

Figure 8:
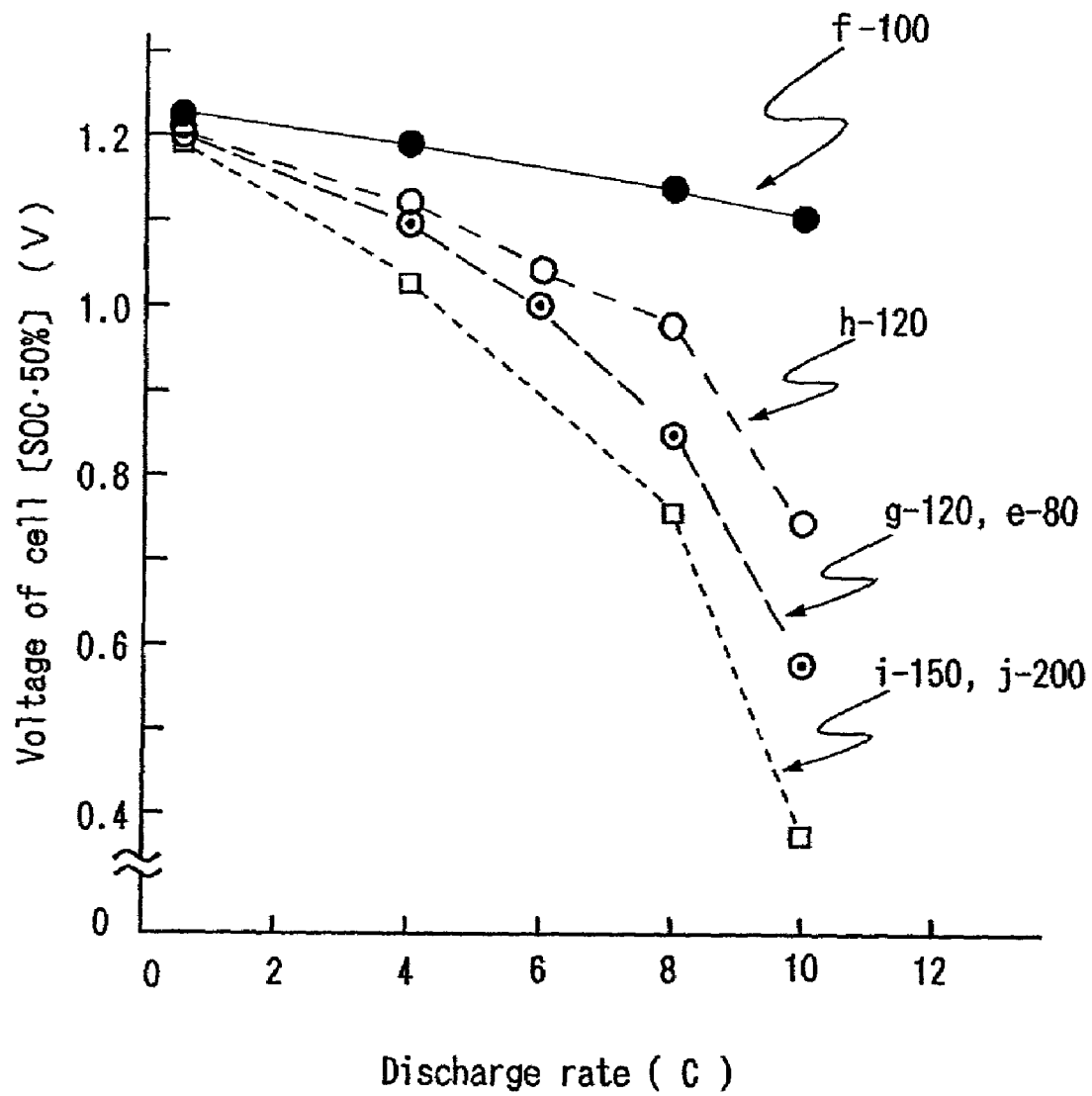
FIG. 8 shows a high rate discharge of sealed cylindrical Ni/MH batteries by an embodiment of the present invention.

The results were shown in FIG. 8 showing the relationship between the rate of discharge and voltage of the batteries. In the figure, f-100 shows the result of the Example 24, e-80 the result of the Example 27, g-120 the result of the Example 36, h-120 the result of the Example 31, and i-150 shows the result of the Comparative Example 15 and j-200 the result of the Comparative Example 20.

The batteries of f-100 showed extremely excellent high power characteristics with the voltage decrease of only 60 mV in the efficient discharge of 10 C-rate. On the other hand, as for e-80, g-120, and h-120, all the batteries extremely reduce their voltage at the time of high discharge of about 8 C-rate. However, its high power characteristics were good maintaining not less than 1 C-rate up until 6V. Further, in the batteries of g-120 and h-120, the voltage of h-120, compared to that of g-120, in the efficient discharge of 10 C-rate, not less than the half of the initial voltage could be kept, which shows that by enhancing the degree of sulfonation, high power characteristics could be improved to a great deal. On the other hand, as for batteries of i-150 and j-200, at the time of high rate discharge with around 8 C, the voltage is extremely reduced and the voltage cannot be kept not less than 1V at the discharge rate of 6 C, proving that they were not good.

For information, as for AA-size sealed cylindrical Ni/MH storage batteries in the Comparative Example 21, by passing the separators through the hot rolls at the temperature of about 100° C., a partial hot melt of the fibers occurs and due to the modification of sulfonation group, hydrophilic property reduces and it gets difficult for conducting charge and discharge, thereby making cycle life test imposible.

As described so far, the processing method for producing the separators of the present invention is capable of realizing high hydrophilic property while maintaining strength, and the Ni/MH batteries using the sulfonated polyolefin separators with the high degree of sulfonation of the present invention are excellent in high power characteristics. Particularly, separators with the thin polyolefin type resin fibers sulfonated to a high degree are capable of obtaining the Ni/MH batteries with improved important property including extremely excellent high power characteristics and high capacity.

The present application claims priority of Japanese application No. 2001-109082, the disclosures of which are incorporated herein by reference. While a detailed description of the invention has been provided above, the present invention is not limited thereto and various modifications will be apparent to those of skill in the art. The invention is defined by the claims that follow.

What is claimed is:

1. An alkaline storage battery, wherein generating elements comprise:
    a positive electrode whose main material is a nickel oxide,
    a negative electrode whose main material is a hydrogen absorbing alloy or cadmium,
    a separator, and
    an alkaline electrolyte,
    the generating elements are contained in a sealed container, wherein the separator is comprised of non-woven cloth fibers whose main material is a polyolefin resin provided with a hydrophilic property by at least a sulfur compound on the fiber surface,
    the separator having:
    (a) a degree of sulfonation, a ratio of sulfur atomic mass to carbon atomic mass (S/C), of $5 \times 10^{-3}$ to $30 \times 10^{-3}$, and
    (b) a tensile strength of not less than 3 kg/cm$^2$.

2. The alkaline storage battery according to claim 1, wherein the positive electrode thickness is 0.3 to 0.5 mm and the negative electrode thickness is 0.15 to 0.3 mm.

3. The alkaline storage battery as set forth in claim 1, wherein the separator comprises at least two fine spun fibers of a polypropylene resin and a polyethylene resin,
    wherein a plurality of the fine spun fibers is integrated to form a fiber bundle, and each of the fiber bundles is partially entangled or fusion bonded by a polyolefin resin having a low melting point,
    the non-woven cloth is provided with the hydrophilic property.

4. The alkaline storage battery as set forth in claim 3, wherein the said fine spun fibers have an average fiber diameter of not greater than 5 µm.

5. The alkaline storage battery as set forth in claim 1, wherein the separator is the non-woven cloth with the hydrophilic property added to a foundation cloth wherein at least two materials of a polypropylene resin and a polyethylene resin are integrated to form a unit fiber and each of the unit fibers is entangled or fusion bonded by a polyolefin resin with a low melting point.

6. The alkaline storage battery as set forth in claim 5, wherein the unit fiber comprises a core-sheath with a polypropylene resin arranged as a core part and a polyethylene resin arranged as a surface part.

7. The alkaline storage battery as sot forth in claim 1, wherein the hydrophilic property comprises a sulfonated group —(SO$_3$H), a group with an alkaline metal, wherein the alkaline metal is substituted for H (hydrogen atom) of the sulfonated group, and a group with F (fluorine atom) wherein the Fluorine is substituted for O (oxygen atom) of the sulfonated group, are chemically combined with polyolefin resin.

8. The alkaline storage battery as set forth in claim 1, wherein the separator comprises the non-woven cloth sulfonated at least in the vicinity of the fiber surface wherein the sulfonation is conducted by the process comprising:
    (1) a preliminary treatment step wherein the non-woven cloth is passed through a water vapor airflow and
    (2) an exposing step wherein the non-woven cloth is conducted with the preliminary treatment and is then exposed to an airflow containing SO$_3$ gas immediately after the preliminary treatment.

9. The alkaline storage battery as set fort in claim 1, wherein the sealed container comprises a metal cylindrical container with an opening at one end and a lid sealed by calking, interposing an insulating resin therebetween, and the sealed container has a bottom thickness of 1.5 to 2.5 times that of a side wall thickness.

* * * * *